United States Patent [19]

Pean

[11] Patent Number: 4,626,376

[45] Date of Patent: Dec. 2, 1986

[54] PROCESS FOR OBTAINING SOLUTIONS HAVING A HIGH CONTENT OF DISSOLVED GAS

[76] Inventor: Jean-Louis Pean, 4, Allée des Maraîchers, 91310 Montlhery, France

[21] Appl. No.: 703,752

[22] Filed: Feb. 21, 1985

[30] Foreign Application Priority Data

Feb. 29, 1984 [FR] France ........ 84 03130

[51] Int. Cl.[4] ........ C09K 3/30

[52] U.S. Cl. ........ 252/305; 261/128; 261/138; 521/56; 521/72

[58] Field of Search ........ 252/305; 53/470; 261/128

[56] References Cited

U.S. PATENT DOCUMENTS

| | | | |
|---|---|---|---|
| 2,070,167 | 2/1937 | Iddings | 252/305 X |
| 2,242,429 | 5/1941 | Johnson | 252/305 X |
| 2,514,463 | 7/1950 | Bayers | 261/130 |
| 2,668,419 | 2/1954 | Mapes | 252/305 X |
| 2,964,165 | 12/1960 | Riley | 252/305 X |
| 3,342,672 | 9/1967 | Webster et al. | 424/45 |
| 3,387,425 | 6/1968 | Flanner | 53/470 |
| 3,996,153 | 12/1976 | Heeb et al. | 252/305 |

FOREIGN PATENT DOCUMENTS

| | | |
|---|---|---|
| 2154959 | 5/1973 | France . |
| 2227896 | 11/1974 | France . |

*Primary Examiner*—Richard D. Lovering

*Attorney, Agent, or Firm*—Browdy and Neimark

[57] ABSTRACT

The solution-saturation (13,26) is produced in a counter-current manner under low pressure of the gas (19) in a chlorofluorohydrocarbon (1) which is sprayed (12A,12B), previously compressed (3), and supercooled (5) to a temperature in the neighborhood of or lower than the temperature chosen for the chlorofluorohydrocarbon dissolved gas mixture at the outlet (30), the first gas-liquid chlorofluorohydrocarbon contact being effected by a bubbling (25) under pressure of the gas in the chlorofluorohydrocarbon (26) under conditions of temperature and pressure lower than the critical conditions, with a strict thermal regulation (31) throughout the dissolving stage so as to effect it below the critical conditions, thereafter the chlorofluorohydrocarbon mixture having a high content of dissolved gas is compressed (28A,28B) under high pressure. Application in the chlorofluorohydrocarbon solutions and in particular dichlorodifluoromethane having a high content of carbon dioxide.

10 Claims, 1 Drawing Figure

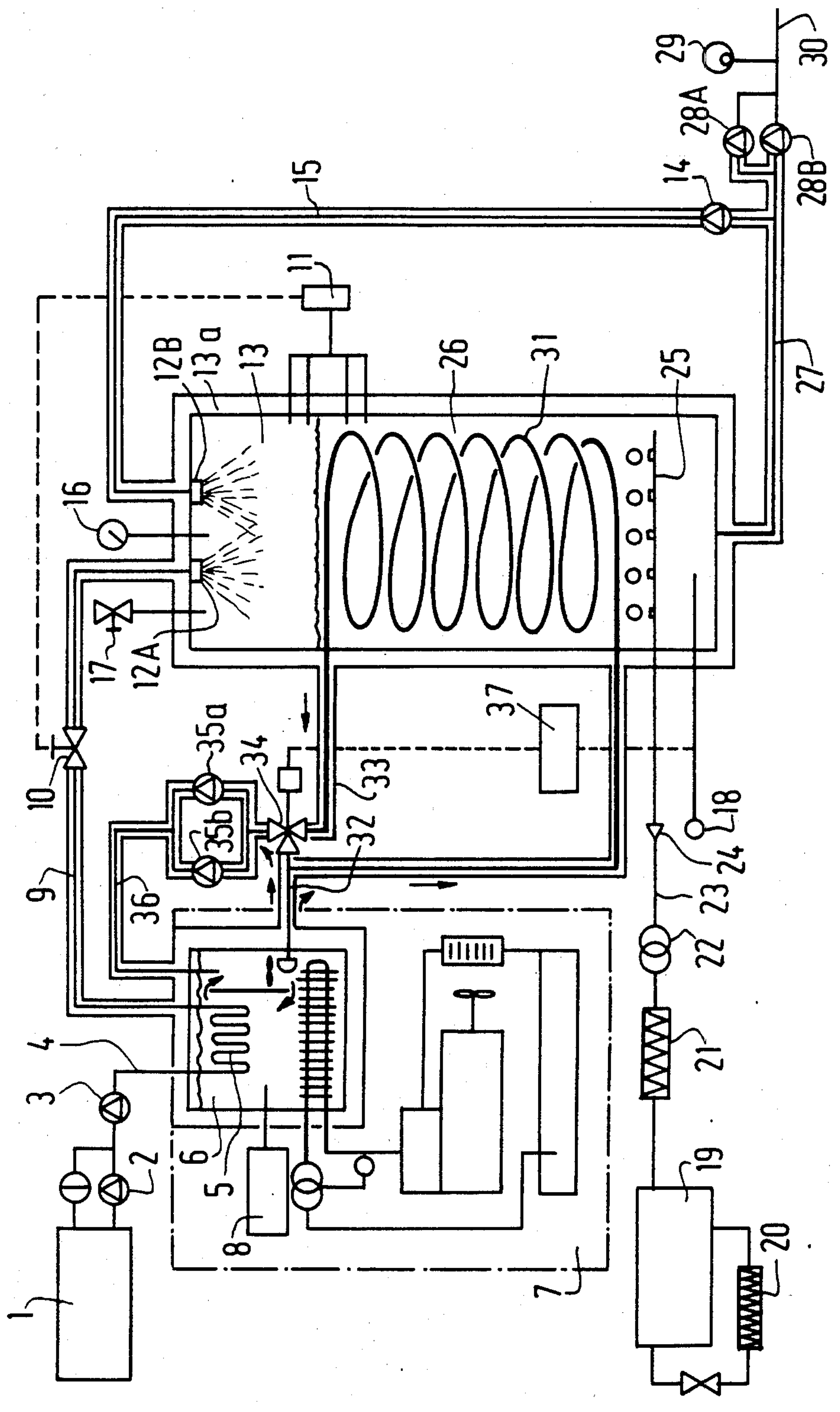
1
2
3
4
5
6
7
8
9
10
11
12A
12B
13
13a
14
15
16
17
18
19
20
21
22
23
24
25
26
27
28A
28B
29
30
31
32
33
34
35a
35b
36
37

PROCESS FOR OBTAINING SOLUTIONS HAVING A HIGH CONTENT OF DISSOLVED GAS

The present invention relates to a process for obtaining solutions having a high content of dissolved gas, the solutions obtained by said process and an installation for carrying out the process.

Attempts have been made for a long time to develop a reliable and efficient technique for storing a maximum amount of gas in a liquid, for the purpose of a regular production of a solvent-gas mixture having a high concentration of the gas at a temperature in the neighbourhood of ambient temperature and at a pressure lower than the vapour pressure of the gas at this temperature.

Among products characterized by a high solubility and a high exothermic reaction, or those having the second characteristic, there may be mentioned carbon dioxide and nitrous oxide.

For the purpose of dissolving carbon dioxide at a high concentration, there has been proposed the compression of this gas at a high temperature, i.e. under 150 bars between 150° and 200° C. in a solvent of the chlorofluorohydrocarbon type, designated commercially under the trademark "Freon". The mixture of carbon dioxide in the "Freon" is adjusted by a controlled flowmeter. However, under these supercritical conditions, the density of the carbon dioxide changes very rapidly as a function of the pressure and controls by means of pressure are correspondingly inaccurate.

Also it has been attempted to obtain the solvent/carbon dioxide mixture, such as a "Freon" carbon dioxide mixture, by always maintaining the carbon dioxide expanded beyond its saturated vapour pressure, that is, at a pressure lower than the critical conditions.

According to the prior technique, the concentration of $CO_2$ in the solution usually does not exceed around 15% or so.

A process has been found whereby it is possible to obtain a regular production of a solvent/carbon dioxide mixture which can reach higher concentrations of 25 to 30% by weight at a temperature in the neighbourhood of 20° C. and at a pressure lower than the vapour pressure of the carbon dioxide at this temperature.

This process comprises effecting the saturation under subcritical pressure of the carbon dioxide in a chlorofluorohydrocarbon by spraying compressed chlorofluorohydrocarbon supercooled to a temperature in the neighbourhood of or lower than that chosen for the $CO_2$/chlorofluorohydrocarbon mixture at the exit, countercurrent to the carbon dioxide, the first gas-liquid contact being achieved by bubbling the carbon dioxide under subcritical pressure in the chlorofluorohydrocarbon, under conditions of temperature and pressure lower than the critical conditions, with a strict thermal regulation throughout the dissolving stage so as to effect it below the critical conditions.

Then the chlorofluorohydrocarbon mixture having a high concentration of carbon dioxide is compressed under high pressure for the purpose of its subsequent use.

The spraying results in a very large liquid-gas area for the liquid/gas contact.

The compressed chlorofluorohydrocarbon is supercooled under surrounding pressure well below the equilibrium temperature. It appears to be advantageous to compress said hydrocarbon so as to spray it under a pressure which is about 10 bars higher than that prevailing in the upper solution-saturation zone, and by supercooling it to a temperature lower by 10° to 20° C. than the temperature of the saturated solution at the outlet of said solution-saturization zone.

The chlorofluorohydrocarbons suitable for carrying out the process are the products known under the trademark "Freon", and in particular "dichlorofluoromethane $CCl_2F_2$", designated by the trademark "Freon 12".

In order to increase the rate of saturation of the Freon with carbon dioxide, it has been found advantageous to recycle a fraction of "Freon" containing dissolved carbon dioxide to the spray after compression and maintenance as concerns temperature under conditions identical to those of the spraying of the pure chlorofluorohydrocarbon.

The ascending bubbling of carbon dioxide, achieved in the lower part of the saturation stage, is effected below subcritical pressure and preferably close to the critical pressure.

In the course of the saturation stage the temperature is fixed at between −10° and +20° C. and preferably lower than the ambient temperature, and maintained by a controlled thermal regulation. The quality of the saturation of the chlorofluorohydrocarbon with carbon dioxide is a function of the precise regulation of the temperature during the dissolving stage; this regulation must be at least on the order of a degree and advantageously in the form of an internal regulation by means of a heat-carrying fluid circulating in a closed circuit, the rate of flow of the heat-carrying fluid inside the solution-saturation zone being regulated by the temperature of said zone.

As the exothermic dissolving reaction is very great and as the temperature of the dichlorodifluoromethane mass may reach +50° C., it will be understood that the hydrocarbon must be cooled so as to introduce it in the saturation zone at a temperature in the neighbourhood of or lower than that fixed for the mixture at its exit of the solution-saturation zone.

Solutions having a very high concentration of carbon dioxide, namely 25 to 30% by weight, are particularly appreciated in many fields of application and in particular in that of the swelling of plastic foams, the manufacture of expanded plastics and rubber foam where they give excellent results also in the technical field of aerosols, in the superpressurization of a liquid having a low vapour pressure, and in the fields of liquid-gas mixtures: carbonation, floatation, etc.

The process of the invention is advantageously carried out in an installation of the type shown in the FIGURE of the accompanying drawing, the temperatures and pressures shown being representative of "Freon 12".

The installation mainly comprises two cold exchangers: a cooling exchanger upstream of the saturator and a regulating exchanger inside the saturator.

The "Freon" is stored in bulk at ambient temperature in the storage tank 1, it passes through a pump 2 with a relief valve of under 15 bars, it is then taken up by the superpressure pump 3 which is of the double-acting piston type. This pump can operate to deliver 500 kg/hour, namely 375 liters/hour, of "Freon 12" (density F 12=1.32 at 20° C.) with a delivery pressure of 40 bars.

The compressed "Freon" is supercooled within the supply pipe 4 in the cold exchanger termed a cooling exchanger 5. The inlet temperature varies between −10° C. and +50° C. and the minimum outlet temperature is −10° C., the instantaneous rate of flow being 500 kg/hour. The pipe within cold exchanger is immersed in a bath 6 having a thermostate of a refrigerating unit 7 capable of lowering the temperature to −10° C. The temperature of the bath having a thermostat is controlled and regulated by means of the temperature regulator 8.

The supercooled "Freon" flows in the heat-insulated pipe 9, passes through the valve 10 controlled by the level regulator 11 of the liquid hydrocarbon in the dissolving zone and then is conveyed, still in a heat-insulated pipe, to the spray nozzle 12A located in the upper part of the saturator 13. This spray nozzle may be of any suitable type, such as the whirling type using a solid cone and impact and of a diameter of 15 to 50 cm, and having a high rate of flow of 500 kg/hour under a differential pressure of 10 bars.

Recycled "Freon" is recompressed in the recycling pump 14 which gives a differential pressure of 10 bars and a rate of flow of 500 kg/hour, then it is raised in the heat-insulated pipe 15 to the spray nozzle 12B of the same type as the spray nozzle 12A and also located in the upper part of the body of the saturator 13.

The body of the saturator 13 has a volume which is a function of the desired rate of flow and may be of cylindrical shape and have for example a height of 2 meters and a diameter of 200 mm and capable of withstanding a test pressure of 50 bars. The saturator is provided with means for controlling the pressure by means of a manometer providing a reading and a low- and high-pressure alarm pressure controller 16 and the purge valve and safety valve 17 set at 35 bars, both of which are placed in the upper part of the saturator 13. It is also provided with means for controlling the temperature of the liquid of the saturator by means of the temperature probe 18, and means for controlling and regulating the level of the "Freon" in the saturator by means of the level regulator 11. The saturator is surrounded by a heat insulation 13*a*.

The carbon dioxide is stored in bulk in the high-pressure storage tank 19 and maintained under a pressure of 40 bars minimum. At 0° C. the pressure is 40 bars, at −5° C. it is 30 bars. Consequently, provision is made for a heating with a negative temperature in winter by means of the heating coil 20. The carbon dioxide delivered at a pressure of at least 40 bars passes through the anti-frost heater 21 of the $CO_2$ pressure reducer 22. The pressure of the carbon dioxide upstream of the pressure reducer is at least 40 bars and downstream of the pressure reducer 30 bars±0.5 bar. The pressure reducer 22 operates with an instantaneous rate of flow of 120 kg/hour (60 $m^3$/hour). The carbon dioxide flows in the pipe 23 provided with a check-valve or an anti-siphoning high point shown at 24, it being possible to associate these two means. This pipe 24 enters the lower part of the body of the saturator 13 where it is extended by a perforated rack 25 for the bubbling under pressure of the carbon dioxide in the liquid "Freon" 26. The temperature of the solution of "Freon" containing $CO_2$ is +10° C. This solution having a high concentration of dissolved $CO_2$ is drawn off through the heat insulated pipe 27 in the lower part of the saturator 13. A fraction of this solution saturated with $CO_2$ is taken off for recycling through the pump 14 and the other fraction intended for subsequent use is compressed by two parallel accelerating pumps 28A and 28B each of which has a minimum rate of flow of 150 kg/hour under a high delivery pressure adjusted in accordance with the requirements of the user, for example at 150 bars, and in the conduit 30 for utilization conveying the mixture to the point of utilization maintaining the $CO_2$ in a dissolved phase, there is inserted an anti-hammering accumulator 29.

The saturator is also provided with an internal exchanger, termed an exchanger-regulator 31, for compensating for the exothermic reaction of the dissolving of the $CO_2$ in the "Freon". This internal exchanger has its lower part located above the bubbling rack 25 for the $CO_2$ and its upper part below the liquid level maintained by the regulator 11.

The heat exchange occurs by means of the heat-carrying fluid constituting the thermostat-controlled bath 6 maintained at −10° C. by the refrigerating unit 7. The current of heat-carrying fluid flowing in the heat-insulated closed circuit between the refrigerating unit and the saturator leaves the thermostat-controlled bath through the heat-insulated pipe 32 and reaches the connection of the pipe 32 to the lower part of the internal exchanger 31 located above the $CO_2$ bubbling rack 25. After a heat exchange in the ascending direction, the heat-carrying fluid, after flowing in the conduit 33, and passing in the triple-valve system 34 is accelerated by the circulating pumps 35*a* and 35*b* so as to be recycled through the heat-insulated pipe 36 to the thermostat-controlled bath 6. The rate of flow of the heat-carrying fluid inside the internal exchanger 31 is regulated by the temperature of the liquid medium in the saturator indicated by the temperature probe 18 and by means of the regulator 37.

What is claimed is:

1. A process for obtaining a solution of a chlorofluorohydrocarbon having 25–30% by weight of dissolved gas, comprising producing solution-saturation in a countercurrent manner under subcritical pressure of the gas in a chlorofluorohydrocarbon previously compressed under pressure and supercooled to a temperature of at least as low as a temperature in the neighbourhood of a chosen temperature, said chosen temperature being the temperature of the dissolved gas-chlorofluorohydrocarbon mixture at the exit, the chlorofluorohydrocarbon being sprayed in a dissolving zone which is maintained under the pressure of the gas, a first contact of the gas with the liquid chlorofluorohydrocarbon being achieved by a bubbling under subcritical pressure of the gas in the chlorofluorohydrocarbon under conditions of temperature and pressure lower than the critical conditions with a strict thermal regulation throughout the dissolving-saturating stage so that it is effected below the critical conditions.

2. A process according to claim 1, wherein the soluble gas is carbon dioxide and the chlorofluorohydrocarbon is dichlorodifluoromethane.

3. A process according to claim 2, comprising previously compressing the dichlorodifluoromethane for spraying it under a pressure which is higher by about 10 bars than the pressure prevailing in a high dissolving-saturating zone, and supercooling it to a temperature lower by 10° to 20° C. than the temperature of the saturated solution at the exit of said dissolving-saturating zone, bubbling the carbon dioxide in a lower dissolving-saturating zone under subcritical pressure, maintaining the temperature in the course of the stage dissolving the carbon dioxide in the dichlorodifluoromethane under subcritical conditions with respect to the ambient temperature by means of an internal thermal regulation of at least on the order of a degree by means of a heat-carrying fluid.

4. A process according to claim 3, wherein the said temperature is maintained in the course of the stage for dissolving the carbon dioxide in the dichlorodifluoromethane lower than the ambient temperature.

5. A process according to claim 2, wherein said subcritical pressure is close to the critical pressure.

6. A process according to claim 1, comprising recycling a fraction of the solvent-chlorofluorohydrocarbon mixture containing the dissolved gas after compressing it and sending it back to the spraying under conditions identical to those of the spraying of the chlorofluorohydrocarbon.

7. A process according to claim 1, comprising accomplishing the supercooling of the chlorofluorohydrocarbon and the regulation of the temperature in the course of the stage for dissolving the gas by means of a common heat-carrying fluid flowing in a closed circuit, the rate of flow of the heat-carrying fluid inside the dissolving-saturating zone being regulated by the temperature in said zone.

8. A process according to claim 1, comprising compressing to high pressure the chlorofluorohydrocarbon mixture solutions having a high content of dissolved gas.

9. A process according to claim 1, wherein said process is continuous.

10. A process for obtaining a 25–30% by weight carbon dioxide solution in a chlorofluorohydrocarbon, comprising supercooling said chlorofluorohydrocarbon to a temperature no greater than about 20° C.; and effecting solution-saturation in a countercurrent manner under subcritical pressure of said carbon dioxide in said supercooled chlorofluorohydrocarbon by spraying said chlorofluorohydrocarbon in a dissolving zone which is maintained under the pressure of said carbon dioxide, a first contact of the carbon dioxide with the liquid chlorofluorohydrocarbon being achieved by bubbling said carbon dioxide at a subcritical pressure thereof through said chlorofluorohydrocarbon under conditions of temperature and pressure lower than the critical conditions with a strict thermal regulation throughout the dissolving-saturating stage so that it is effected below the critical conditions.

* * * * *

UNITED STATES PATENT AND TRADEMARK OFFICE
CERTIFICATE OF CORRECTION

PATENT NO. : 4,626,376

DATED : December 2, 1986

INVENTOR(S) : Jean-Louis PEAN

It is certified that error appears in the above-identified patent and that said Letters Patent is hereby corrected as shown below:

On the first page of the patent, add:

[73] Assignee: L'Air Liquide, Societé Anonyme pour l'Etude et l'Exploitation des Procédés Georges Claude Paris, France

Signed and Sealed this

Seventh Day of April, 1987

*Attest:*

DONALD J. QUIGG

*Attesting Officer*

*Commissioner of Patents and Trademarks*